United States Patent [19]

Yoshimura et al.

[11] Patent Number: 4,864,472
[45] Date of Patent: Sep. 5, 1989

[54] SOLID ELECTROLYTE CAPACITOR

[75] Inventors: Susumu Yoshimura, Yokohama; Sohji Tsuchiya, Kanagawa; Yasuo Kudoh, Yokohama; Toshikuni Kojima, Kawasaki, all of Japan

[73] Assignee: Matsushita Electric Industrial Co., Ltd., Kadoma, Japan

[21] Appl. No.: 175,216

[22] Filed: Mar. 30, 1988

[30] Foreign Application Priority Data

Apr. 6, 1987 [JP] Japan .................................. 62-84019

[51] Int. Cl.$^4$ ................................................. H01G 9/00
[52] U.S. Cl. .................................... 361/525; 252/62.2; 29/570.1
[58] Field of Search .............................. 357/8; 29/570.1; 361/433 A, 433 S, 433 C, 306, 323, 525; 252/62.2

[56] References Cited

U.S. PATENT DOCUMENTS

| | | | |
|---|---|---|---|
| 3,538,395 | 11/1970 | Riley | 29/570.1 X |
| 3,675,087 | 7/1972 | Zykov et al. | 361/433 |
| 4,609,971 | 9/1986 | Shaffer | 361/433 |
| 4,721,601 | 1/1988 | Wrighton et al. | 357/8 X |

FOREIGN PATENT DOCUMENTS

| | | | |
|---|---|---|---|
| 76357 | 7/1978 | Japan | 29/570.1 |
| 49513 | 5/1981 | Japan | 361/433 |
| 89663 | 5/1986 | Japan | 357/8 |

Primary Examiner—Donald A. Griffin
Attorney, Agent, or Firm—Cushman, Darby & Cushman

[57] ABSTRACT

A solid electrolytic capacitor uses a solid electrolyte wherein manganese dioxide is uniformly diffused in a polymer made by electrochemical polymerization, and the solid electrolyte is disposed between a first electrode made of valve metal and having an anodic oxide film thereon and a second electrode opposite to the first electrode. The solid electrolytic capacitor shows splendid high frequency characteristics and small leakage current.

6 Claims, 4 Drawing Sheets

SOLID ELECTROLYTE CAPACITOR

FIELD OF THE INVENTION AND RELATED ART STATEMENT

1. FIELD OF THE INVENTION

The present invention relates to a solid electrolyte capacitor having a novel solid electrolyte and particularly to a capacitor which has favorable high frequency characteristics and small leakage current.

2. DESCRIPTION OF THE RELATED ART

Recently, with development of digital circuits of various electric appliances, demand for small-sized capacitors for the digital circuits, which have low impedances at high frequencies and large capacities, is increasing.

Heretofore, plastic film capacitors, mica capacitors, laminated ceramic capacitors or the like have been used as capacitors for high frequency use. However, in film capacitors and mica capacitors, it is difficult to realize large capacity and small size at the same time. Furthermore, when minimal of size and increased of capacitance are intended in the laminated ceramic capacitor, the temperature characteristics thereof become poor, and further, the capacitors will be costly.

On the other hand, as capacitors of large capacity, an aluminum dry electrolytic capacitor, an aluminum or tantalum solid electrolytic capacitor and the like are well known.

In such capacitors, it is possible to have a large capacitance, since in such capacitors, an anodic oxide film as dielectric can be made very thin. On the other hand, however, the oxide film is liable to be easily damaged and therefore, it is necessary to provide such capacitor with an electrolyte layer between the anodic oxide film and a cathode, thereby restoring the damaged oxide film by anodic oxidation (self-healing). In an aluminum dry electrolytic capacitor, etched aluminum films as anode and cathode are wound by a paper separator therebetween, into which the electrolyte is impregnated. This type of capacitor has unfavorable characteristics, namely a decrease of capacitance and increase of dielectric loss (tan δ) due to leakage and evaporate of the electrolyte, and furthermore, there is a problem of significant deterioration of high frequency characteristics and low temperature characteristics due to decrease in ion conductivity of the electrolyte.

Moreover, in the aluminum or tantalum solid electrolytic capacitor, manganese dioxide has been used as a solid electrolyte to solve the above-mentioned problems of the aluminum dry electrolytic capacitor. Such electrolyte is obtained by immersing an anodic element into manganese nitrate aqueous solution and subjecting it to thermal decomposition at about 350° C. In the case of such capacitors, there is no leakage of the electrolyte and deterioration of capacitor performances based on congelation thereof at low temperature, since the electrolyte is not a liquid but a solid. Therefore, it exhibits better frequency characteristics and temperature characteristics than that of the capacitor employing liquid electrolyte. However, there is a problem in that the impedance at high frequencies and dielectric loss are higher by one digit than that of the laminated ceramic capacitor or the plastic film capacitor, because of the damage of the oxide film based on the thermal decomposition of manganese nitrate and low electrical conductivity of manganese dioxide itself.

In order to solve the above-mentioned problem, it has been proposed to use an organic semiconductor such as 7.7.8.8-tetracyanoquinodimethane (hereinafter referred to as TCNQ) complexes as the solid electrolyte. This electrolyte based on TCNQ has excellent electric conductivity and anodic oxidation ability. The organic semiconductor can be applied on and impregnated onto the anodic oxide film by dissolving it in organic solvent making a molten state by heating, and thereby, damage of the oxide film due to thermal decomposition in the impregnation process of $MnO_2$ thereinto can be avoided. As a result, a solid electrolytic capacitor having large capacitance can be realized, since the TCNQ complex has high electric conductivity, and excellent anodic oxidation ability and high frequency characteristic.

For instance, Japanese unexamined published patent application (Sho 58-17609) discloses an invention wherein the organic semiconductor made of N-n-propylisoquinoline and the TCNQ are used as solid electrolyte. According to the above-mentioned invention of Sho 58-17609, the impregnation of the TCNQ salt into a wound type aluminum electrolytic capacitor is made by heating the TCNQ salt to a melt. And as a result, strong adhesion between the TCNQ salt and the oxide film is attained. The TCNQ salt has high electric conductivity, thereby providing an aluminum electrolytic capacitor which is much improved in the characteristics of frequency and temperature. As mentioned above, use of the organic semiconductor based on the TCNQ salt as the solid electrolyte has been known and enables one to make capacitors which have better frequency and temperature characteristics than solid electrolytic capacitors which use $MnO_2$ as the solid electrolyte, since the TCNQ salt has better electric conductivity and anodic oxidation ability. Additionally, in the above-mentioned invention of Sho 58-17609, the oxide film is impregnated with the N-alkylisoquinolinium TCNQ salt.

On the other hand, recently, various kinds of solid electrolytic capacitors using a polymer made by electrochemical polymerization (hereinafter referred to as "electrochemical polymer") as the solid electrolyte are provided in Japanese published unexamined patent application Sho 60-245209 or the like.

Polymer films made by electrochemically polymerizing heterocyclic five member compounds such as pyrrole and thiophene on the electrode show high electric conductivity and comparatively high stability, and therefore, it is possible to use them as a material for a cathodic electrode of the capacitor. In general, the electrochemical polymerization is carried out as follows: A monomer such as pyrrole and a supporting electrolyte such as tetraethylammonium perchlorate ($Et_4N \cdot ClO_4$) are dissolved in a solvent (organic solvent or water). Then electrodes are put into this solution, and an electric voltage is applied thereon, thereby to form a polymer film on the anode by oxidation polymerizing reaction.

In the electrochemical polymerization, $ClO_4^-$ ions in the supporting electrolyte are doped in the pyrrole film, and as a result, the pyrrole film has a high electric conductivity. Similar compounds such as thiophene, bipyrrole, bithiophene, α-terthienyl or thienylpyrrole can be used as the monomer. Examples for other monomers are as follows: fused-ring (polycyclic) aromatic compound such as benzene, naphthalene, anthracene, pyrene, heterocyclic compound such as furan, indole, carbazole, phenothiazine, thienothiophenone, amino compound such as aniline, phenylenediamine, aminopyrine.

The electrochemical polymer film is easily synthesized and hence high quality film having high conductivity can be obtained. Therefore, it has desirable for use as the solid electrolyte or the anodic electrode material in the solid electrolytic capacitor.

However, ions do not flow in the electrochemical polymer film, since it is an entirely electronic conductor. Therefore, the electrochemical polymer does not show any electrochemical activity. For example, if the electrochemical polymer of pyrrole is used as the solid electrolyte of the solid electrolytic capacitor, it is not useful for restoring the anodic oxide film, since it lacks anodic oxidation ability, which is one of the basic requirements for the solid electrolyte of the capacitor. Therefore, the resulting capacitor has a poor break down voltage and a large leakage current. Because of the lack of anodic oxidation ability, the conventional electrochemical polymer is clearly different from TCNQ salt as the solid electrolyte.

As mentioned above, the conventional material has a limitation in the function of an electrochemical polymer per se. Therefore, recently, various kinds of hybrid methods have been developed for giving further function to the polymer.

Examples of the hybrid method are as follows:

Dopants capable of giving further function to the electrochemical polymer such as pyrrole-sulfonated phthalocyanine, surface-active agents and high molecular electrolyte (e.g. sulfonated polystyrene) are doped in the electrochemical polymer thereby improving the characteristics thereof. Powders of ruthenium dioxide ($RuO_2$) or iron oxide may be diffused in a polypyrrole film at the same time as polymerization of monomer. Further, there is a high grade hybrid method wherein general purpose polymer such as polyvinyl chloride, polyvinylidene fluoride and polyvinyl alcohol is applied on the electrode, and then pyrrole or the like is electrochemically polymerized thereon, thereby to make a polymer alloy. These hybrid methods are described in (November 1986) a preprint of SJ 35-Symposium on macromoleules read by Susumu Yoshimura.

However, it is impossible to make the electrochemical polymer having satisfactory characteristics by the conventional methods suggested therefrom. For example, when it is intended to make a hybrid conductor made of manganese dioxide and the electrochemical polymer of polypyrrole by the conventional method, the following method can be conceived: pyrrole monomer is electrochemically polymerized in the electrolyte wherein fine powders of manganese dioxide is suspended. However, in this method, non-uniform dispersion of manganese dioxide powders occurs, and as a result, electrical conductivity control ability and electrochemical activity are insufficient. Moreover, when other electrochemically active substances such as lead dioxide diffuse in the pyrrole polymer film by the same manner as the above, insufficient results are obtained, as the above.

OBJECT AND SUMMARY OF THE INVENTION

The object of the present invention is to solve the above-mentioned problems and obtain a high performance solid electrolytic capacitor by giving electrochemical activity to an electrochemical polymer, thereby developing an anodic oxidation ability which is indispensable for the solid electrolyte.

These objects are accomplished by an electrolytic capacitor which comprises:

a first electrode made of a valve metal having an anodic oxide film thereon, a second electrode opposing to the first electrode, a solid electrolyte which is a hybrid conductive film made by electrochemical method and comprising a manganese dioxide and an electrochemical polymer, the solid electrolyte being disposed between the first electrode and the second electrode.

In the solid electrolyte of the present invention, almost complete amorphous manganese dioxide is uniformly dispersed in the electrochemical polymer, and therefore, the electrochemical polymer having high electric activity functions as a solid electrolyte. As a result, the solid electrolyte capacitor having high anodic oxidation ability, high break down voltage and small leakage current is obtained.

DESCRIPTION OF THE PREFERRED EMBODIMENTS

Hereafter, preferred embodiments of the present invention are explained with reference to the accompanying drawings.

The preparation process of the solid electrolyte of the present invention is characterized in that electrochemical polymerization of monomer and electrochemical oxidation synthesis of manganese dioxide occur simultaneously. Manganese dioxide is classified variously after its method of making. Electrochemical manganese dioxide (ECM) is made by applying a voltage of about 3V to a manganese sulfate aqueous solution held at 80°–90° C. thereby to precipitate manganese dioxide on the anode. The electrolytic capacitor of the present invention is obtained by making use of both reactions of the electrochemical oxidation reaction of manganese and the oxidation polymerization reaction of monomer such as pyrrole which are made at the same time.

Figure 1:
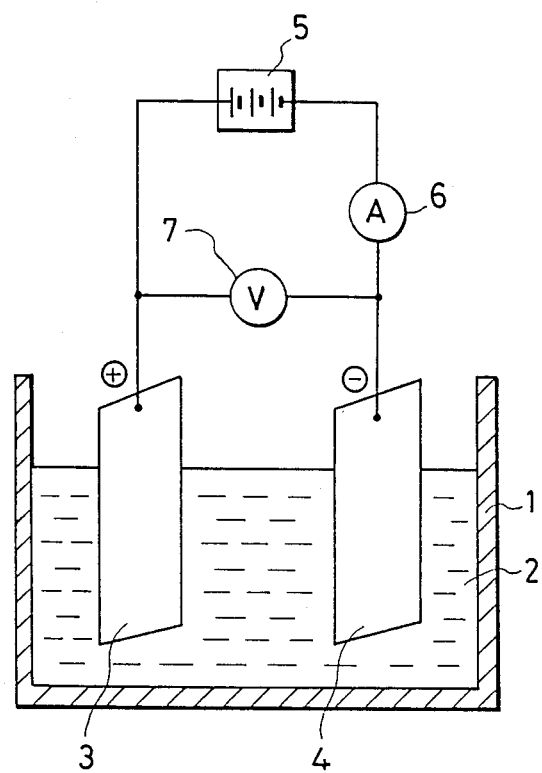
FIG. 1 is a schematic view showing an electrochemical polymerization apparatus used for making a solid electrolyte of the present invention.

FIG. 1 shows an electrochemical polymerization apparatus to be used for making a hybrid conductive polymer. Electrolyte solution 2 is contained in a glass container 1. An anode 3 and a cathode 4 are dipped in the electrolyte solution 2, and a predetermined current or a predetermined voltage is applied thereto from a constant current source or a constant voltage source 5. The current and voltage are observed by an ampere meter 6 and a voltmeter 7, respectively.

It is possible in theory to effect electrochemical polymerization by either constant current method or constant voltage. However, according to material to be used, the polymerization is caused at a particular voltage and further, there are cases that the voltage at which $MnO_2$ is produced depends on a composition of the electrolyte. Therefore, the constant voltage method is desirable. In this embodiment, the electrochemical polymerization was effected by using an anode made of platinum, indium-tin oxide (transparent electrode), stainless steel containing large amount of chromium or the like and a cathode made of platinum black, platinum mesh or the like having a large surface area.

As the monomer, pyrrole, thiophene, thienylpyrrole, aniline and furan or the like can be used. Among the above, pyrrole, thiophene, aniline and furan could be used in aqueous solution state. Manganese salt such as manganese sulfate, manganese nitrate or manganese chloride was used as the supporting electrolyte. It is also possible to make polymerization with mixing the conventional supporting salts with the above-mentioned manganese salt. Salts derived from tosylate ion (Tos), sulfate ion ($SO_4^{2-}$), perchlorate ion ($ClO_4^-$), tetrafluoroborate ion ($BF_4^-$) nitrate ion ($NO_3^-$), oxalate ion ($C_2O_4^{2-}$) or the like which have high solubility to water or organic solvent can be used as the supporting salt.

First, in a system wherein the electrolyte is an aqueous solution containing only $MnSO_4$ of 0.2 mol/l without containing pyrrole, a dark brown uniform film was formed on the anode 3 by applying voltage of above 2.5– 3.0 V at room temperature. The film had poor adhesiveness to a substrate and was very fragile. It was proved that the film is $\gamma$ type $MnO_2$ by X-ray diffraction spectrum. Next, when pyrrole is added to the electrolyte by 0.1 mol/l and the voltage is applied, a black and uniform film was deposited on the anode 3. When the film was observed by electron microscope in a magnification of $10^5$, no particle like $MnO_2$ were observed. Moreover, existence of $\gamma$-$MnO_2$ was not observed by X-ray diffraction analysis. However, according to X-ray fluorescence spectrum, existence of 10–20% of Mn atoms was observed and as a result, it was proved that a uniform hybrid structure (molecularly dispersed structure) of polypyrrole and $MnO_2$ was realized.

In general, $\gamma$-$MnO_2$ has higher electrochemical activity than that of $\beta$-$MnO_2$ made by thermal decomposition. This corresponds to ionic conductivity such as proton and hydroxide ion in $MnO_2$. The solid electrolyte of the present invention (for example, pyrrole/$MnO_2$ hybrid electrochemical polymer film) has high electrochemical activity, since the film contains substantially complete amorphous $MnO_2$ in a molecularly dispersed state. Furthermore, since electric conductivity of polypyrrole is 500 S/cm and that of $\gamma$-$MnO_2$ is about 0.1 S/cm, the electric conductivity of the composite film can be continuously controlled in a range of 0.1–500 S/m.

It is impossible in using only $MnO_2$ to compose a thin film device by forming a thin film on the substrate, since $MnO_2$ can not form a thin film and is poor in adhesion ability to the substrate. However, according to the present invention, it is possible to form the thin film device.

Figure 2:
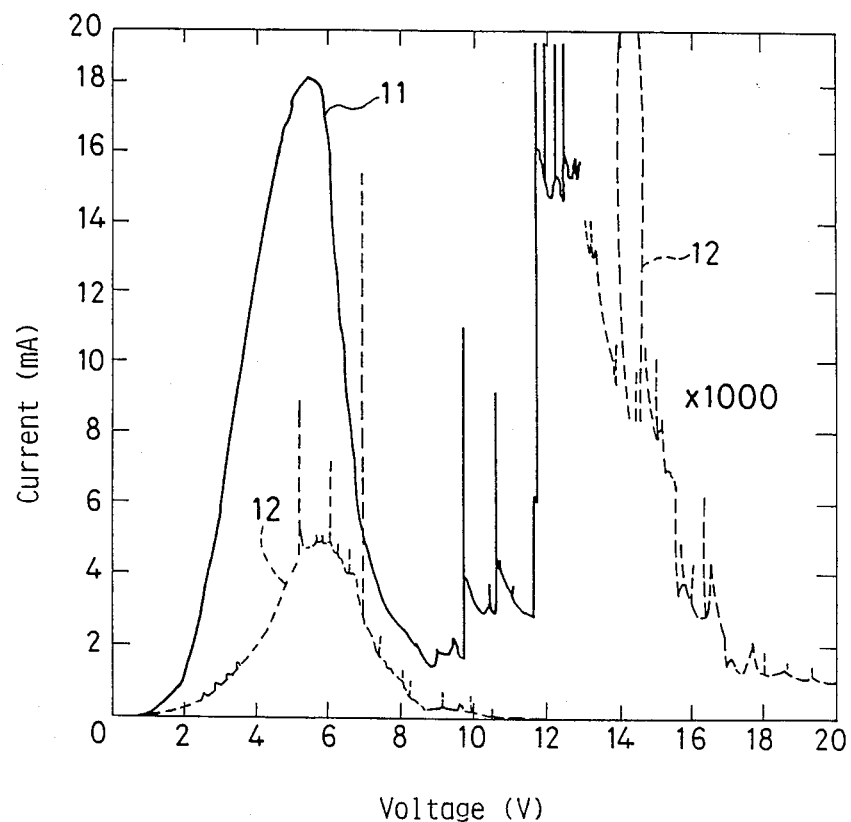
FIG. 2 is a diagram showing a current-voltage curve of the hybrid conductive film of the present invention which is contacted to tantalum.

A primary feature of the hybrid conductive polymer of the present invention is to obtain remarkable electrochemical activity. That is, an anodic oxidation ability is realized by the present invention. The electrochemical polymer film, which is a matrix, is a complete electronic conductor, and therefore, it is considered that the electrochemical activity of $MnO_2$ diffused therein remarkably decreases. On the contrary, the electrochemical activity actually increased. FIG. 2 shows current-voltage curves of the hybrid conductive film contacted to tantalum (Ta) metal. When Ta is used as the anodic electrode, the current smoothly decreased above a certain voltage as shown curve 11. This shows that Ta was anodically-oxidized in the solid phase. When this data is compared with data concerning TCNQ salt which has been read on Bulletin of Chemical Society of Japan (Bull. Chem. Soc. Jpn), vol 50, page 3153, 1977, it is proved that the anodic oxidation ability of the hybrid conductive film is far higher than that of the conventional $MnO_2$ and is not less than that of TCNQ salts. Moreover, curve 12 shows that even when Ta was used as the cathodic electrode, an insulation film which is not based on oxidizing reaction was formed thereon, and therefore a capacitor using the hybrid conductive film of the present invention also shows a high break down voltage against the counter voltage.

Furthermore, when such a hybrid conductive film is synthesized by using a valve metal such as tantalum and aluminum as the electrode, a uniform film can be deposited on the surface of the valve metal by using the electrochemical polymerization apparatus shown in FIG. 1. Further, by using the same apparatus, the anodic oxidation of the valve metal can also be made by selecting a proper voltage. Accordingly, the solid electrolytic capacitor can be composed by combining the above-mentioned two electrochemical reactions.

That is, the solid electrolyte capacitor is obtainable by selecting a proper voltage, thereby forming the anodic oxidation film on the valve metal and forming the hybrid conductive film as the solid electrolyte thereon, and disposing it between two electrodes.

Figure 4:
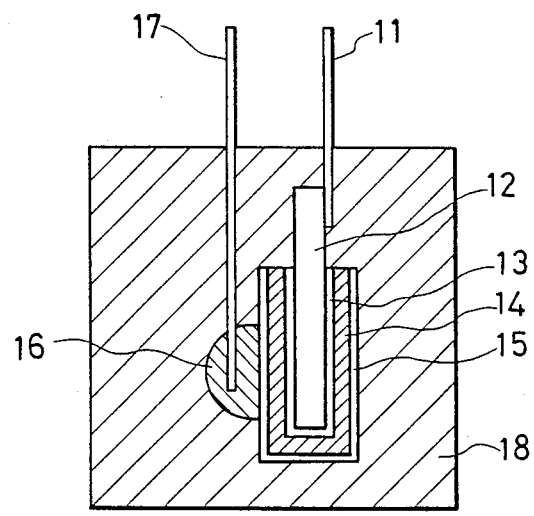
FIG. 4 is a sectional view showing a solid electrolyte capacitor embodying the present invention.

The embodiment shown in FIG. 4 has in an epoxy resin mold, the following members:
anodic lead . . . 11
valve metal . . . 12
anodic oxide film . . . 13
hybrid conductive film . . . 14
graphite layer . . . 15
conductive layer . . . 16
cathodic lead . . . 17.

Example 1

Pyrrole of 0.2 mol/l was added to purified water, and NaTos of 0.8 mol/l was dissolved therein. When applying ultrasonic wave to the solution, it is left for 30 minutes. As a result, oil like pyrrole was completely dissolved in the solution, thereby obtaining a uniform solution and then $MnSO_4$ of 0.4 mol/l was dissolved therein. An anode made of high-chromium-stainless and a cathode made of platinum were dipped into the solution while keeping a distance of 2 cm therebetween. Then a fixed voltage was applied thereto, to make an electrochemical polymerization.

When electrolysis was conducted for 10 minutes under respective voltage of 2.0, 2.5, 3.0, 3.5, 4.0, 5.0 V, growth of a black film was observed at above 2.5 V. At above 4.0 V, the growth rate of the film was ununiform, and parts exfoliated from the substrate were observed here and there. Thicknesses of film obtained under the voltage of 2.5, 3.0 and 3.5 V were 5, 16 and 14 $\mu$m, respectively, and electric conductivity thereof were 25, 40 and 16 S/cm, respectively. The electric conductivity of the film made by adding no manganese sulfate was 400 S/cm, and therefore the electric conductivity of the hybrid conductive film is clearly lowered by containing $MnO_2$. Content of Mn was 26 weight % with X-ray fluorescence analysis and X-ray photoelectron spectrometry (XPS). Any crystal structure was not observed with X-ray diffraction.

Example 2

Thiophene or thienylpyrrole of 0.1 mol % was added to mixture solvent of acetonitrile and water, and tetraethyl ammonium tosylate (TEA·Tos) of 0.1 mol % and $MnSO_4$ of 0.05 mol % were dissolved therein as electrolyte, thereby making a polymerization reaction in the same way as Example 1. Thiophene and thienyl were most effectively polymerized at the voltage of 4.5 V and 2.5 V, respectively, and film thickness was about 20 $\mu m$ after 10 minutes of the polymerization. Electrical conductivity of each film was 2.1 and 0.4 S/cm, respectively. Content of Mn was about 5%.

Aniline and furan could be polymerized under the condition that $MnSO_4$ and tetraethylammonium perchlorate (TEA·C$10_4$) were used as supporting electrolyte and a mixture of water and acetonitrile or water and isopropyl alcohol was used as a mixture solvent, and voltage of 3-4 V was applied. Particularly, in case that aniline was used, a high quality film could be obtained under a low pH condition which is prepared by adding hydrochloric acid, sulfuric acid or the like.

Example 3

Figure 3:
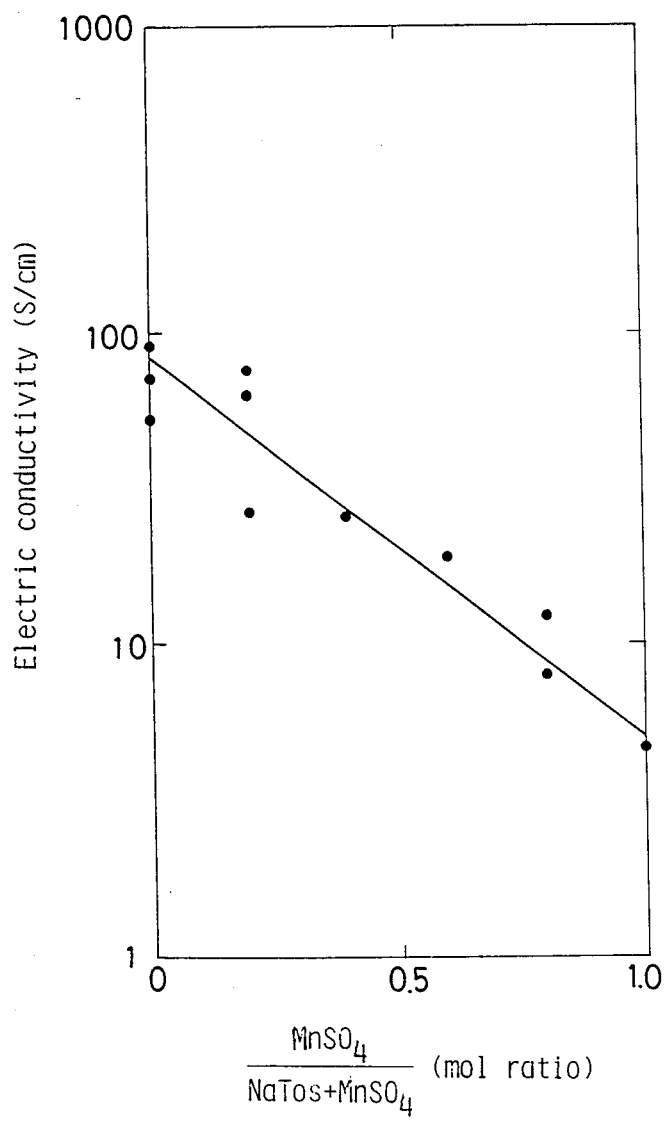
FIG. 3 is a characteristic view showing a dependence of electric conductivity on composition of an electrolyte in a polymer film made by polymerizing pyrrole with using sodium tosylate and manganese sulfate as a supporting electrolyte.

First aqueous solution containing pyrrole of 0.2 mol/1 and NaTos of 0.5 mol/1 and second aqueous solution containing pyrrole of 0.2 mol/1 and $MnSO_4$ of 0.5 mol/1 were prepared and mixed in the following ratio: 10:0, 8:2, 6:4, 4:6, 2:8 and 0:10, thereby preparing electrolyte solutions. Polymerization was made by using these electrolyte solutions for 20 minutes under a fixed electrolytic voltage of 3.5 V, thereby obtaining thin film. The electric conductivity of the resultant film is shown in FIG. 3. It was proved that the electric conductivity changes in logarithmic linearity between about 100 S/m-1 S/m. This is also an effect of uniform diffusion of $MnO_2$ into polypyrrole.

Moreover, the electric conductivity could be changed between 100 S/cm-0.1 S/cm by changing ratio of content of pyrrole, NaTos and $MnSO_4$. However, when the ratio of $MnSO_4$ was above 75%, the resultant film was very much fragile because of increase of $MnO_2$ content, and therefore it has a problem in practical use.

Example 4

Manganese nitrate ($Mn(NO_3)_2$) of 0.5 mol/1 was dissolved in an aqueous solution containing pyrrole of 0.25 mol/1 and sodium salt of sulfonated polystyrene. By making electrochemical polymerization under the condition of using a transparent electrode and voltage of 3.0 V, a same black and uniform film as example 1 was formed onto the transparent electrode. In this example, the strength of above-mentioned film was larger and the electric conductivity was higher as 250 S/cm than those of example 1 wherein $MnSO_4$ was used.

According to X-ray diffraction spectrum, in polypyrrole hybrid electrochemical polymerization film, very small amount of $\epsilon$ type $MnO_2$ was observed through $MnO_2$ is essentially amorphous.

Moreover, the same experiment as the above was made by using mixed electrolyte of $MnCl_2$, $MuClO_4$ and NaTos, and as a result, a hybrid electrochemical polymerization film having essentially the same characteristics as the above was obtained.

Example 5

An electrolyte solution was prepared by dissolving pyrrole of 0.2 mol/1, NaTos of 0.1 mol/1 and $MnSO_4$ of 0.4 mol/1 in water. A tantalum (Ta) plate and a platinum (Pt) mesh were used as an anode and a cathode, respectively, and voltage was applied thereon. Regardless of the distance between the anode and the cathode, in a range of applied voltage of 2.5-3.5 V, formation of the hybrid conductive film was given priority and in a range of 3.5-5.0 V, anodic oxidation of Ta was given priority further at above 6 V, both of them being caused at the same time. Thus, a solid electrolyte layer and $Ta_2O_5$ layer were formed by making electrolysis for 30 minutes at 3.5 V and for 2 hours at 15 V.

Then, colloidal graphite and silver paste were applied on the electrochemical polymerization film, thereby making a capacitor. Initial characteristics of the capacitor were as follows: Capacitance was 125 $\mu F$ at 120 Hz, dielectric loss was 0.7%, and leakage current was 0.12 $\mu A$ (10 V). Impedance at 1 MHz was 0.1 m $\Omega$, and was about 1/50 of that of the conventional Ta-solid electrolytic capacitor.

Example 6

The same experiment as Example 5 was made by using aluminum plate as an anode. In the experiment, sodium salt of sulfonated polystyrene (NaSPS) was used substituting for NaTos of Example 5. Voltage for forming the hybrid polymerization film was 4.0 V and voltage for forming an anodic oxide film was 50 V.

As a result, a capacitor having characteristics of capacitance of 47 $\mu F$, dielectric loss of 13% and leakage current of 0.66 $\mu A$ was obtained.

Example 7

Electrolyte solution was prepared by dissolving thiophene of 0.01 mol/1, tetraethyl ammonium paratoluenesulfonic acid of 0.06 mol/1 and manganese nitrate of 0.2 mol/1 in a mixed solvent of water and acetonitrile. Electrochemical polymerization was made by using a sintered body of Ta as an anode.

Polymerization voltage was 4-5V and the anodic oxidation voltage was 67 V. Capacitance of the resultant capacitor was 128 $\mu F$ which is 76% of that of the conventional capacitor using heat decomposition $MnO_2$. Dielectric loss was below 2.0% and leakage current was below 3 $\mu A$ (25 V).

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is

1. A solid electrolytic capacitor comprising
   A first electrode made of a valve metal having an anodic oxide film thereon,
   a second electrode opposing to said first electrode,
   a solid electrolyte which is a uniform hybrid conductive film made by electrochemical method and comprising manganese dioxide and an electrochemical polymer, said solid electrolyte being disposed between said first electrode and said second electrode.

2. A solid electrolytic capacitor in accordance with claim 1 wherein;

said electrochemical polymer is made by anodic oxidation polymerization of a monomer selected from the group consisting of pyrrole, thiophene, thienylpyrrole, aniline, indole and furan.

3. A solid electrolytic capacitor in accordance with claim 1 wherein;
said hybrid conductive film is made by making oxidation reaction of manganese and electrochemical polymerization of monomer at the same time on a surface of said valve metal, with using
an electrolyte which is at least a monomer selected from the group consisting of pyrrole, thiophene thienylpyrrole, aniline, indole and furan, and
a supporting electrolyte which is at least one member selected from the group consisting of
  a salt selected from the group consisting of manganese sulfate, manganese nitrate and manganese perchlorate,
  a compound selected from the group consisting of paratoluene sulfonic acid, phthalic acid, oxalic acid and tetrafluoroborate and
  a mixture of said salt and said compound.

4. A solid electrolytic capacitor in accordance with claim 1 wherein;
said manganese dioxide is substantially uniformly dispersed in said electrochemical polymer film.

5. A solid electrolyte comprising
an electrochemical polymer and
maganese dioxide substantially uniformly dispersed in said electrochemical polymer.

6. A solid electrolyte in accordance with claim 5 wherein;
said electrochemical polymer is made by making anodic oxidation polymerization of at least one monomer selected from the group consisting of pyrrole, thiophene, thienylpyrrole, aniline, indole, and furan.

* * * * *